United States Patent [19]

Matsumura et al.

[11] 3,862,252

[45] Jan. 21, 1975

[54] METHOD OF SELECTIVE HYDROGENATION OF CYCLOPENTADIENE

[75] Inventors: Shoichi Matsumura; Yasushi Kato; Masakazu Uekita, all of Kobe, Japan

[73] Assignee: Kanegafuchi Kagaku Kogyo Kabushiki Kaisha, Kita-Ku, Osaka, Japan

[22] Filed: Dec. 27, 1973

[21] Appl. No.: 428,782

[30] Foreign Application Priority Data
Dec. 28, 1972 Japan.................................. 47-2448
Jan. 18, 1973 Japan.................................. 48-8307
Jan. 18, 1973 Japan.................................. 48-8308
June 13, 1973 Japan.............................. 48-67089

[52] U.S. Cl............................. 260/666 A, 252/473
[51] Int. Cl.............................................. C07c 13/12
[58] Field of Search.................. 260/666 A; 252/473

[56] References Cited
UNITED STATES PATENTS
1,222,660  4/1917  Paal ................................... 252/473
1,845,439  2/1932  Pier et al. ........................... 252/473
2,030,283  2/1936  De Rewal ........................... 252/473
3,022,359  2/1962  Wiese et al. .................... 260/666 A
3,251,892  5/1966  Seefelder et al. .............. 260/666 A
3,316,319  4/1967  Armstrong...................... 260/666 A
3,369,052  2/1968  Howell et al..................... 260/666 A
3,408,415  10/1968  Dovell et al. ................... 260/666 A
3,751,497  8/1973  Schwerdtel ..................... 260/666 A
3,751,499  8/1973  Tazuma et al. ................. 260/666 A

*Primary Examiner*—Delbert E. Gantz
*Assistant Examiner*—Veronica O'Keefe
*Attorney, Agent, or Firm*—Moonray Kojima

[57] ABSTRACT

A method of producing cyclopentene by a selective hydrogenation of cyclopentadiene with molecular hydrogen using a catalyst consisting essentially of palladium or palladium and iron, impregnated on a magnesium oxide having a surface area smaller than 100 m$^2$/g. The catalyst may be reactivated by heating at a temperature of 200° to 600°C.

10 Claims, No Drawings

METHOD OF SELECTIVE HYDROGENATION OF CYCLOPENTADIENE

BACKGROUND OF THE INVENTION

This invention relates to a method of producing cyclopentene by selective hydrogenation of cyclopentadiene.

In the prior art, there are various methods of producing cyclopentene by selective hydrogenation of cyclopentadiene. These prior methods use as catalysts those mainly having as main components nickel or palladium. These prior catalysts have been found to be unsatisfactory. For example, when the nickel containing catalyst is used, increasing of selectivity causes decrease in catalytic activity and resulting low conversion rate and longer reaction times. Prior palladium catalysts also have disadvantages. Their activity has been reduced by such treatments as addition of various compounds.

For example, a palladium catalyst with added sulphides (Japanese Patent Publication S.45(1970)/21,289) has such disadvantages as poor conversion rate and contamination of the resultant product with sulfur. A method appearing in German Pat. No. 1,181,700, employes the hydrogenation in the presence of alcohols, and an after treatment, to obtain cyclopentene from a reaction mixture. This method is too complicated, and its retention time is long. Another prior method employes addition of palladium and chromium or copper to a carrier to form a catalyst for use in hydrogenation of acetylene or diolefin mixed in olefin (Japenese Patent Publication S. 40(1965)/9,005). This catalyst is sold on the market under the trademark "G-55B" by Chemetron Corporation and uses palladium and chromium impregnated on an alumina carrier. Its ability to selectively hydrogenate diolefin is limited within a low concentration of diolefins, such as several percent, and in case of selective hydrogenation of diolefin to monoolefin at a high rate, its high selectivity and conversion rate is considerably decreased.

The present inventors had previously discovered a method to remove these and other defects and produce cyclopentene with high selectivity and good yield by selective hydrogenation of cylopentadiene in a gas phase using a catalyst of palladium and iron impregnated on alumina with a surface are smaller than 100 m²/g, or more preferably, smaller than 20 m²/g.

SUMMARY OF THE INVENTION

The present inventors have discovered a catalyst consisting essentially of palladium or palladium and iron as an active component and magnesium oxide with a surface area smaller than 100 m²/g as a carrier. This catalyst enables production of cyclopentene from cyclopentadiene by hydrogenation with high selectivity, high yields, long catalyst life, high conversion rate and low residence time. The hydrogenation may be carried out in gaseous or vapor phase.

In addition we discovered that the catalyst could be reactivated by heating to a temperature of 200° to 600°C.

The foregoing and other features, objects and advantages of the invention are further illustrated hereinbelow.

DETAILED DESCRIPTION OF PREFERRED EMBODIMENTS

The examples set forth hereinbelow show that the selectivity, yields, conversion rate, catalytic life, among other properties, of a catalyst comprising palladium or palladium and iron as the active component and magnesium oxide as a carrier are substantially improved over the prior art, and also when compared to the catalyst discovered by the present inventors previously and employing alumina as the carrier.

Advantageously, by using the described catalyst of this invention, cyclopentene is effectively produced in a good yield and with long catalytic life. When magnesium oxide, which has a basic character in a solid state, is used as a carrier, polymerization of unsaturated compounds occuring on its surface is in a negligible quantity as compared to when alumina is used as a carrier. The alumina has acidic active centers on the surface to accelerate the polymerization. Also, the byproducts produced on the surface of magnesium oxide catalyst do not adsorb strongly on it.

The present invention may be used for industrial production of cyclopentene from cyclopentadiene because the conversion rate and yield are high. Accordingly amount of cyclopentadiene which are unreacted and amounts of cyclopentane obtained as a byproduct are kept low and hydrogenation is carried out in a short residence time.

The catalyst used in this invention may contain 0.01 to 5.0 percent by weight of palladium, or more preferably 0.01 to 2.0 percent by weight; or same may contain the above stated amount of palladium and 0.01 to 5.0 percent by weight of iron or more preferably 0.01 to 2.0 percent by weight of iron. The palladium or palladium and iron, in the amounts stated, is impregnated on the surface of magnesium oxide which is used as the carrier. The surface area should be smaller than 100 m²/g, or more preferably smaller than 50 m²/g. The catalyst may be prepared by spraying a solution containing a palladium compound or a mixture of palladium compound and iron compound on the magnesium oxide carrier. Another way is to dip the carrier into the solution. Then the compound or compounds impregnated on the carrier are reduced to metallic state with hydrogen, hydrazine or formaldehyde.

The selective hydrogenation of cyclopentadiene in the present invention may be carried out at a temperature within the range of 50° to 250°C, or more preferably, in the range of 70° to 180°C, and at an ordinary (i.e., atmospheric) pressure, or at a pressure a little higher than ordinary pressure. The hydrogen gas is used in an amount of the molar ratio to cyclopentadiene of 1.0 to 3.0, or more preferably 1.0 to 2.0.

Even the improved catalyst system of this invention, however, shows some gradual activity deterioration in the course of long term use. Cyclopentadiene is inherently an unstable compound even at room temperature and very easily self polymerizes. Thus, even when cyclopentadiene is heated to a temperature of 70° to 180°C in a short time, such as done in the present invention during hydrogenation, it is impossible to carry out the reaction without a trace of thermal polymerization taking place prior to hydrogenation reaction of the cylopentadiene. This leads to positioning of polymerisates onto the surface of the catalyst thus masking active sites and thereby causing deterioration of the catalytic activity.

Appearance of such deterioration of catalyst activity to a non-negligible degree in vapor phase partial hydrogenation of cyclopentadiene in relatively shorter reaction period, is said to be unavoidable. Hence, an important problem is to recover the deteriorated catalytic activity of catalysts used in large scale operation of vapor phas hydrogenation reaction, which type of reaction may be preferably used, due to advantageous residence time in the reaction chamber.

Thus, there is need for a reactivation method, requiring only a short time and simple procedure, to reactivate any deterioration of catalytic activity.

The present inventors, through a series of investigations of the foregoing problem, discovered that the catalyst activity can be almost perfectly recovered without any undesirable effect on catalyst life when the catalyst of deteriorated activity, is heated at a temperature of 200° to 600°C. This may be done by placing the deteriorated catalyst in a gas flow atmosphere of 200° to 600°C; or by simply heating the deteriorated catalyst to 200° to 600°C in a gas ambient at ordinary pressure; or treating the deteriorated catalyst at 200° to 600°C in reduced pressure gas. The length of time of exposure to the stated temperature range is not critical and hence is not limited in any way. The thusly treated catalyst will be effective for another long term operation. The effect of this reactivation treatment is remarkable especially when applied to the magnesia supported catalyst of the invention. The reactivated catalyst is just as effective as a newly produced catalyst. Thus, by simple exposure to heat of 200° to 600°C for any arbitrary time and at any suitable pressure or gas flow, the inventive catalyst is reactivated.

The gas to be used in the recovery process may be inert gases, hydrogen, oxygen-containing inert gas mixture, such as air or steam. The space velocity of the gas flow is not limited to any specific range. Care must be taken that the catalyst bed temperature during the treatment not exceed the upper limit of thermal stability of the catalyst when oxygen-containing gas mixture is used.

Actual examples are now set forth hereinbelow to illustrate further the principles of this invention, which examples are not to be construed to limit the invention.

EXAMPLE 1

A catalyst A containing 0.5 percent by weight of palladium was prepared as follows: After dipping 60 ml of magnesium oxide with a surface area smaller than 1 $m^2/g$ in 60 ml of 3.5 percent aqueous hydrochloric acid solution containing 2.32 m moles of palladium chloride, the contained water was expelled by a rotary evaporator.

The palladium chloride impregnated on the magnesium oxide was reduced with an aqueous solution of 10 percent of caustic soda and 10 percent of hydrazine, washed with water until no trace of chloride was found to exist and then dried at 150°C in a vacuum dryer for 12 hours.

Next, a process of hydrogenation using the catalyst obtained above will be explained. Cyclopentadiene to be used in the hydrogenation was prepared from dicyclopentadiene by a known method of thermal decomposition. The cyclopentadiene, evaporated by a preheater and mixed with a definite amount of hydrogen controlled by a flow meter, was fed continuously into a U-type glass tube (60 cm in length and 1.3 cm inner diameter) containing 25 ml of catalyst A.

The U-tube was dipped in an oil bath and heated to a reaction temperature defiend by oil bath temperature. The reaction product was received by cooling with a dry ice-methanol cooling medium. Conversion rates, selectivity, and yields of cyclopentene shown in Table 1 are mean values per hour during progress of reaction. Analysis was performed by gas chromatography. Reference Example 1.

A catalyst B, containing 0.5 percent by weight of palladium impregnated on α-alumina having a surface area small than 1 $m^2/g$ as a carrier, was prepared as in Example 1 and a hydrogenation reaction was similarly carried out. Results are shown in Table 1.

TABLE 1 (Obtained Results of Hydrogenation)

Reaction conditions: Reaction temperature, 120°C. Amount of cyclopentadiene used, 87.8 g/hr. Molar ratio of $H_2$/cyclopentadiene, 1.1. Retention time =(volume of catalyst/volume of gas fed/sec) = 1.0 sec.

|  | Time of hydrogenation (hr) | Conversion rate (%) (1) | Selectivity (%) (2) | Yield of cyclopentene (%) (1) |
|---|---|---|---|---|
| Ex. 1, | 0–4 | 96.2 | 87.2 | 83.9 |
|  | 4–8 | 97.5 | 87.8 | 85.6 |
| Catalyst | 8–12 | 96.8 | 89.0 | 86.2 |
| A | 12–16 | 95.3 | 89.6 | 85.4 |
|  | 16–20 | 94.7 | 90.3 | 85.5 |
|  | 20–24 | 93.5 | 90.6 | 84.7 |
| Reference | 0–2 | 97.4 | 73.4 | 71.5 |
| Ex. 1, | 2–4 | 98.9 | 75.0 | 74.2 |
| Catalyst | 4–6 | 95.6 | 76.7 | 73.2 |
| B (3) | 6–8 | 93.2 | 78.2 | 72.9 |

Note:
(1) Based upon cyclopentadiene used.
(2) Based upon cyclopentadiene reacted.
(3) Reaction temperature was 70°C.

EXAMPLE 2

A catalyst. C, containing 0.45 percent by weight of palladium and 0.30 percent by weight of iron, was prepared in the following way. After dipping a 60 ml of magnesium oxide with a surface area smaller than 1 $m^2/g$ into an aqueous solution of 3.5 percent hydrochloric acid containing 2.32 m mole of palladium chloride and 4.42 mmole of ferrous chloride ($FeCl_2.4H_2O$), the contained water was expelled by a rotary evaporator.

The chlorides impregnated on the magnesium oxide were reduced with an aqueous solution containing 10 percent of caustic soda and 10 percent of hydrazine and washed with water until no trace of chloride was to be found, and then dried at 150°C in a vacuum evaporator for 12 hours.

A process of hydrogenation using the catalyst above prepared was run in the same manner as in Example 1. The results are shown in Table 2.

REFERENCE EXAMPLE 2

A catalyst D, containing 0.51 percent by weight of palladium and 0.30 percent by weight of iron, impregnated on α-alumina with a surface area smaller than 1 $m^2/g$ as a carrier, was prepared as in Example 2 and a hydrogenation reaction was similarly carried out. The results are shown in Table 2.

TABLE 2 (Obtained Results of Hydrogenation)

Reaction conditions: Reaction temperature, 120°C. Amount of cyclopentadiene used, 87.8 g/hr. Molar ratio of H₂/cyclopentadiene, 1.1. Retention time= volume of catalyst/volume of gas fed/sec= 1.0 Sec.

|  | Time of hydrogenation (hr) | Conversion rate (%) (1) | Selectivity (%) (2) | Yield of cyclopentene (%) (1) |
| --- | --- | --- | --- | --- |
|  | 0 – 4 | 99.3 | 90.8 | 90.2 |
| Example 2 | 4 – 8 | 100 | 91.5 | 91.5 |
| Catalyst C | 8 – 12 | 98.7 | 93.8 | 92.6 |
|  | 12 – 16 | 96.5 | 97.5 | 94.1 |
|  | 16 – 20 | 96.2 | 96.0 | 92.4 |
|  | 20 – 24 | 94.8 | 97.3 | 92.2 |
| Reference | 0 – 2 | 95.3 | 92.0 | 87.7 |
| Example 2 | 2 – 4 | 93.3 | 93.1 | 86.9 |
| Catalyst D | 4 – 6 | 91.2 | 94.3 | 86.0 |
|  | 6 – 8 | 89.5 | 95.5 | 85.5 |

Note:
(1) Based upon cyclopentadiene used.
(2) Based upon cyclopentadiene reacted.

EXAMPLE 3

A catalyst E, containing 0.48 percent by weight of palladium and 0.32 percent by weight of iron, impregnated on magnesium oxide with a surface area smaller than 1 m²/g as a carrier, was prepared as in Example 2.

Using above catalyst E, the same experiment as in Example 2 was carried out. Then, the deteriorated catalyst was reactivated by heating for 2 hours in air at ordinary atmospheric pressure at 500°C. The process was repeated in 24 hours cycles. The results are shown in Table 3.

EXAMPLE 4

A catalyst F, containing 0.53 percent by weight of palladium and 0.23 percent by weight of iron, impregnated on magnesium oxide having a specific surface area of 27 m²/g, was used for hydrogenation reaction in the same manner as in example 2. Then the deteriorated catalyst was restored by heating for two hours at 500°C in air flow of space velocity of 2,000 hr⁻¹. The process was repeated in 48 hours cycles. The results are shown in Table 3.

strued to be within the spirit and scope of this invention.

What is claimed is:

1. A method of producing cyclopentene by selective hydrogenation of cyclopentadiene with molecular hydrogen using a catalyst consisting essentially of palladium or palladium and iron disposed on a carrier of magnesium oxide having a surface area smaller than 100 m²/g.

2. The method of claim 1, wherein said palladium is used in an amount of from 0.01 to 5.0 percent by weight, and said iron is used in an amount of from 0.01 to 5.0 percent by weight.

3. The method of claim 2, wherein said amount of palladium is from 0.01 to 2.0 percent by weight, and wherein said amount of iron is from 0.01 to 2.0 percent by weight.

4. The method of claim 1, wherein said selective hydrogenation is carried out at a temperature of from 50° to 250°C, at about atmospheric pressure and with hydrogen at a molar ratio to cyclopentadiene of 1.0 to 3.0.

5. The method of claim 4, wherein said temperature is from 70° to 180°C, and said molar ratio is from 1.0 to 2.0.

6. The process of claim 1, wherein said palladium or palladium and iron are disposed on said carrier by dipping said carrier into one or more compounds containing said palladium or palladium and iron, removing excess water therefrom, and reducing the resulting impregnated compound to a metallic state using an agent selected from the group consisting of hydrogen, hydrazine and formaldehyde.

7. The process of claim 5, wherein said hydrogenation is for a period of from 1 to 24 hours.

8. The process of claim 1, wherein said catalyst is reactivated after use in said hydrogenation reaction by exposing said catalyst to a temperature of from 200° to 600°C.

9. The process of claim 8, wherein said catalyst is exposed to said temperature in a gas atmosphere flow; a gas ambient at atmospheric pressure, or a gas ambient at reduced pressure.

TABLE 3

|  | Cycle Time | History | Conversion (%) (1) | Selectivity (%) (2) | Yield of Cyclopentene (%) (1) |
| --- | --- | --- | --- | --- | --- |
|  | 1 | Newly prepared | 95.6 | 95.1 | 90.0 |
| Example 3 | 2 | After 1st reactivation treatment | 97.9 | 94.3 | 92.3 |
| Catalyst E | 3 | After 2nd reactivation treatment | 98.4 | 93.5 | 91.9 |
|  | 30 | After 29th reactivation treatment | 94.7 | 96.8 | 91.7 |
|  | 1 | Newly prepared | 95.3 | 93.1 | 88.7 |
| Example 4 | 2 | After 1st reactivation treatment | 98.0 | 92.4 | 90.6 |
| Catalyst F | 3. | After 2nd reactivation treatment | 96.4 | 92.9 | 89.6 |
|  | 15 | After 14th reactivation treatment | 94.6 | 93.6 | 88.8 |

Note:
(1) Based on Fed cyclopentadiene
(2) Based on consumed cyclopentadiene

The foregoing description illustrates the principles of the invention. Numerous variations and modifications thereof would be apparent to the worker skilled in the art. All such variations and modifications are to be con- 10. The process of claim 9, wherein said gas is selected from the group consisting of inert gases, hydrogen and oxygen-containing inert gas mixtures.

* * * * *